Aug. 29, 1939. E. E. CLINE 2,171,078
BREAKABLE STEM FOR FIRE HYDRANTS
Filed Dec. 28, 1936
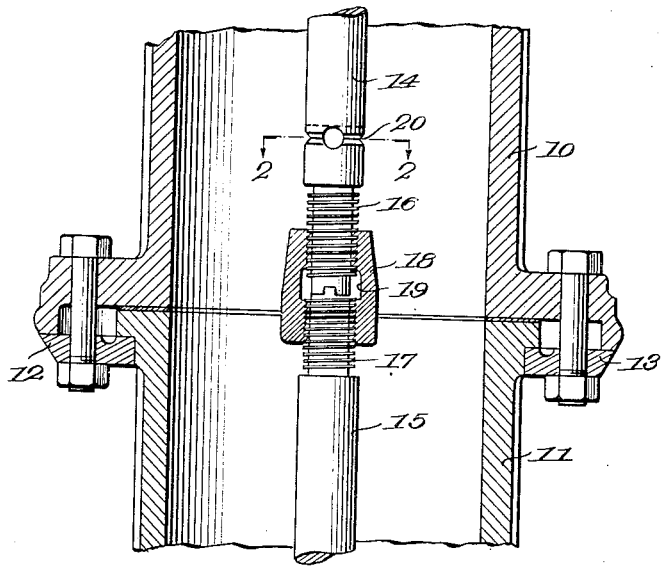
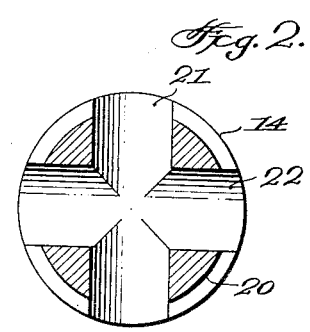
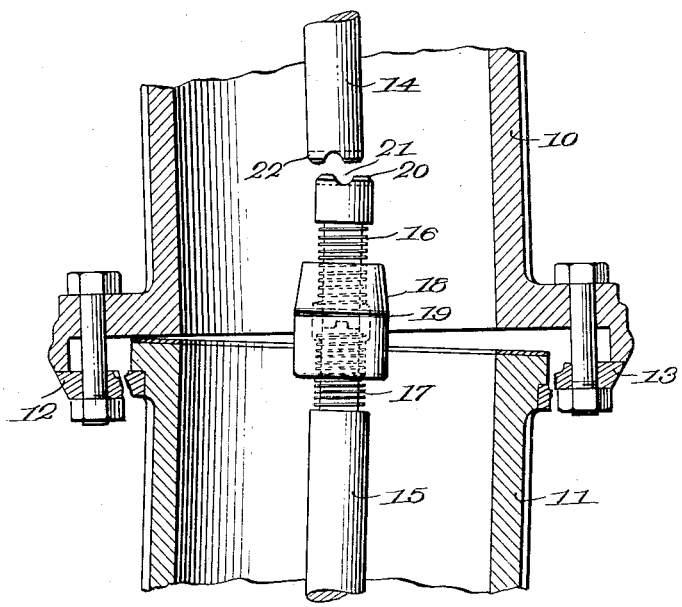
Inventor
Earl E. Cline Patented Aug. 29, 1939

2,171,078

UNITED STATES PATENT OFFICE 2,171,078

BREAKABLE STEM FOR FIRE HYDRANTS

Earl E. Cline, Decatur, Ill., assignor to Mueller Co., Decatur, Ill., a corporation of Illinois Application December 28, 1936, Serial No. 118,005

1 Claim. (Cl. 287—1)

This invention relates to improvements in fire hydrants and particularly in the valve operating stems of fire hydrants, an object of the invention being to minimize damage to the stem under conditions of strain such as arise not infrequently due to accidental collision of vehicles with the hydrant, etc. Since the invention will be best understood from a consideration of a practical embodiment thereof, I shall describe the invention with reference to the accompanying drawing in which Figure 1 is a partial sectional view of a hydrant stock or barrel with a portion of the new stem shown in elevation.

Figure 2 is a section substantially on line 2—2 of Figure 1, and

Figure 3 is a view similar to Figure 1, but showing the parts in the relation assumed as the result of a rupturing blow.

Referring to the drawing, reference numerals 10 and 11 designate upper and lower parts or sections of a fire hydrant stock or barrel, the sections being joined in end to end relation by means including semi-circular frangible members 12 and 13 in the manner substantially as described in United States Patent 2,017,600, granted October 15, 1935, to Herbert M. Lofton. A sufficiently heavy impact delivered to the upper section 10 will cause the joint between the sections to be ruptured in the manner shown in Figure 3 and as fully described in the said Lofton patent.

Extending longitudinally of the barrel is a valve actuating stem comprising upper and lower portions 14 and 15, the former extending upwardly for engagement by the usual operating means and the latter extending downwardly to a flow controlling valve, the valve being operated by movement of the stem.

The adjacent ends of the stem portions are threaded at 16 and 17, the threads 16 having a steeper pitch than the threads 17. The adjacent extremities of the stem portions are provided with a groove and tongue respectively.

A sleeve or nut 18 is threaded at its end portions for engagement with the threads 16 and 17 respectively, there being a medial unthreaded portion 19 providing clearance for the stem portions.

To assemble the stem, sleeve or nut 18 is screwed down as far as possible on the thread 17 and portion 14 is then screwed in the sleeve 18 to bring the groove into register with the tongue with the two as close together as possible. The parts 14 and 15 are now held stationary and nut 18 is screwed upwardly. Since it pulls the portion 14 downwardly faster than it itself moves upwardly the groove and slot are brought into engagement and the stem portions are thus rigidly secured together against relative rotation.

The described joint is generally the same as that disclosed in United States Patent 2,018,455, granted October 22, 1935, to Herbert M. Lofton. The sleeve 18 of the present invention, however, differs somewhat in form from the one disclosed in the last mentioned patent, and particularly, as here shown, has solid walls, the longitudinal slots of the patent being omitted. Instead of the rupturable nut or sleeve of the patent, I provide the stem portion 14 above its threaded end 16 with a weakened zone, here shown as arising from the provision of an annular groove 20 and transverse bores 21 and 22 in the plane of the groove.

The sleeve 18 and the weakened zone of stem portion 14 are in the vicinity of the barrel joint and under the conditions shown in Figure 3, wherein the barrel joint is ruptured, stem portion 14 breaks at the groove 20, as shown. In other words, the zone defined by the groove 20 and bores 21 and 22 is weaker than any other portion of the stem, including the threaded portions 16 and 17 and the sleeve 18 so that the point of breakage under relative bending of the stem portions is definitely determined.

In the use of the stem coupling shown in the above mentioned Patent No. 2,018,455, the coupling sleeve is not only destroyed, but not infrequently the threads of the upper stem member are so stripped or mutilated that the said stem member has to be replaced in its entirety. It is a feature of the present invention that the coupling sleeve 18 is not damaged under rupturing conditions and consequently the only replacement needed is the upper stem portion 14 which has been broken in the manner shown in Figure 3. With the break occurring at the point indicated, the lower broken end of stem portion 14 is sufficiently accessible so that it may be readily uncoupled from the portion 15 upon suitable manipulation of sleeve 18. Portion 15 remains undamaged as well as sleeve 18 and it will thus be seen that in accordance with the present invention I have confined replacement to the readily accessible upper stem portion 14.

It will be understood that the invention is susceptible of varied embodiment and that accordingly I do not limit myself to details of form and arrangement except as in the following claim.

I claim:

A valve operating stem for a fire hydrant, said hydrant comprising an upright stock having upper and lower parts joined in end to end relation by a rupturable joint, said stem being operatively disposable in longitudinally extending relation in the stock and comprising upper and lower portions whose adjacent ends will be in the vicinity of the joint when the stem is operatively disposed in the stock, and means operatively coupling said adjacent ends, said coupling means including means locking the stem portions against rotation relative to each other and including also means preventing relative axial displacement of the stem portions, said upper stem portion being locally weakened above said coupling means so as to be more readily breakable under binding stresses than said lower stem portion and said coupling means whereby breakage of the stem in use will be confined to said upper portion.

EARL E. CLINE.